Sept. 5, 1933.  D. G. LORRAINE  1,925,491
APPARATUS FOR SEPARATING OIL AND GAS
Filed March 11, 1930
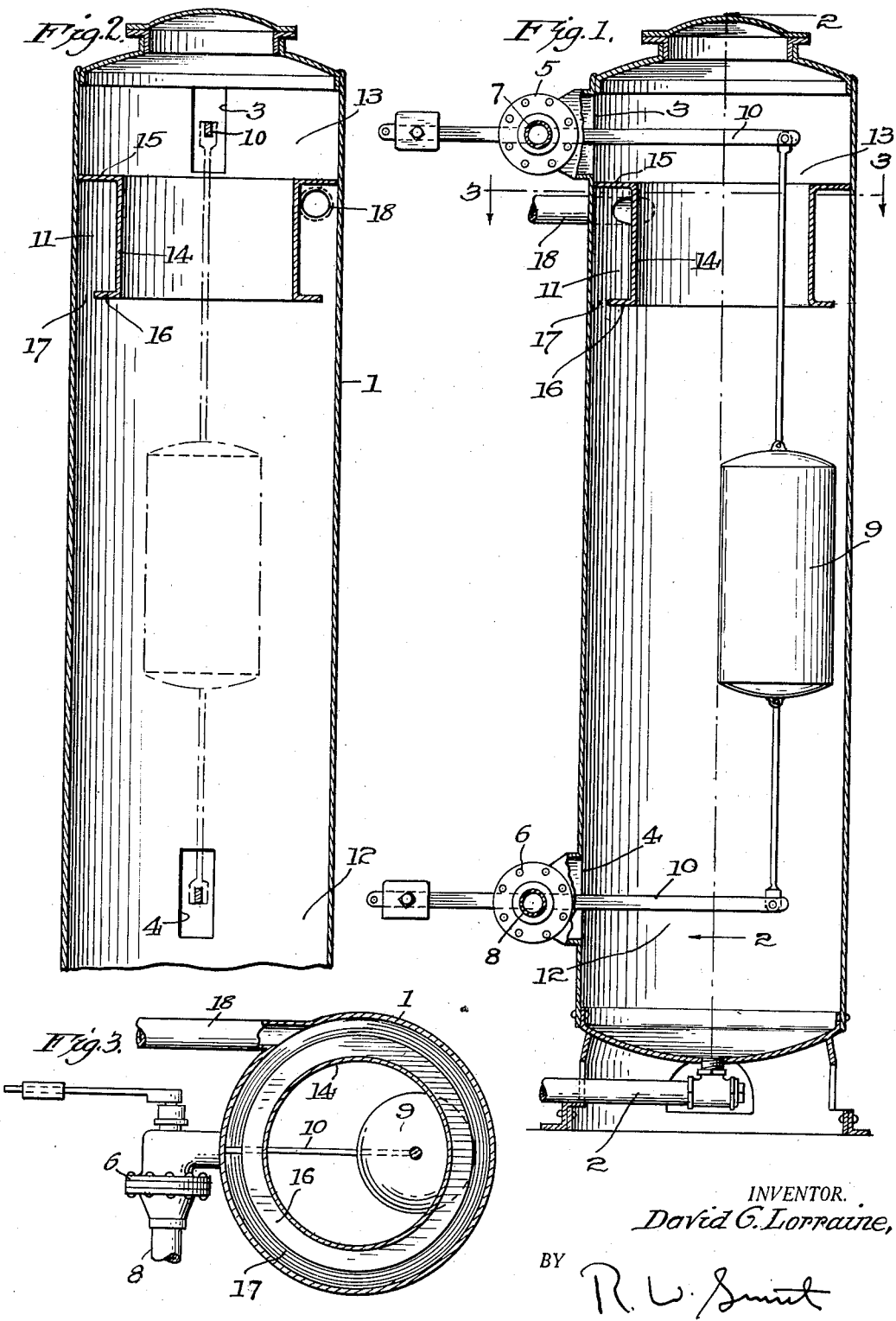
INVENTOR.
David G. Lorraine,
BY
R. L. Smith
ATTORNEY.

UNITED STATES PATENT OFFICE 1,925,491

APPARATUS FOR SEPARATING OIL AND GAS

David G. Lorraine, Los Angeles, Calif.

Application March 11, 1930. Serial No. 435,004

7 Claims. (Cl. 193—2.7)

This invention is an apparatus for separating oil and gas and removing foreign ingredients such as sand and water from the flow from an oil well; and has for its object to rotatably agitate the flow from a well so as to separate the various constituents by centrifugal force, and to then discharge the entire flow into a settling chamber where it is no longer subjected to rotary agitation and may thus assume a quiescent state eliminating frothing and permitting complete stratification of the various constituents as a result of their release from intimate association by the initial rotary agitation.

It has heretofore been proposed to separate oil and gas by rotary agitation but results have been unsatisfactory, due I have found to the failure to maintain the entire flow in a quiescent state subsequent to the rotary agitation so that all of the gas is in a quiescent condition when separating from the oil. By collecting the gas, not when initially separated by rotary agitation, but only after having subsided to a quiescent state, I have found that complete separation of the oil, gas and foreign matter such as sand and water may be readily obtained, and that only dry gas will collect at the gas discharge.

The initial rotary agitation tends to separate the various constituents by centrifugal force, and even though the rotary agitation subsides before the various constituents are separately collected, they will have been so released from their intimate association as a result of the initial rotary agitation that all of the dry gas will readily rise from the quiescent body of fluid and may be thus separately withdrawn, and sand and water will similarly settle for separate removal, leaving the oil completely separated from the other constituents and adapted for separate withdrawal.

The invention will be readily understood from the following description of the accompanying drawing showing a preferred apparatus, and in which:

Fig. 1 is an axial section through a separator constructed in accordance with the invention.

Fig. 2 is a vertical section on the line 2—2 of Fig. 1.

Fig. 3 is a horizontal section on the line 3—3 of Fig. 1.

The separator comprises a closed casing 1 having a sand discharge 2 at its base and gas outlet 3 and oil outlet 4 opening through the side wall of the casing adjacent its top and spaced slightly above its base respectively.

Valves 5 and 6 control the respective outlets 3—4 with pipes 7 and 8 for the gas and oil leading from the respective valves, and the valves are regulated in usual manner by a float 9 mounted in the separator and connected by operating levers 10 to the respective valves so that movement of the float responsive to variations in the oil level in the separator will correspondingly regulate the discharge of gas and oil.

A scrubbing chamber 11 is provided in casing 1 and is adapted to receive the flow from an oil well and subject the same to rotary agitation and then discharge the flow into the main casing which forms a settling chamber 12 at its lower portion and a gas collecting chamber 13 at the top thereof. The scrubbing chamber 11 is distinctly separate from the settling and collecting chambers 12—13, and may be formed by an annular wall 14 concentrically mounted in the upper portion of casing 1 and appreciably radially spaced from its side wall, with an annular flange 15 extending from the upper end of wall 14 to the side wall of the main casing so as to close the top of the scrubbing chamber, and a horizontal annular flange 16 projecting radially from the bottom of wall 14 but terminating in appreciably spaced relation from the side wall of the main casing so as to partially enclose the bottom of the scrubbing chamber but at the same time provide an annular discharge therefrom at the side wall of the main casing as shown at 17.

The scrubbing chamber 11 is in the upper portion of casing 1, preferably just below the gas outlet 3 so that the central bore which is defined by the annular wall 14 provides communication between the settling chamber 12 and the gas collecting chamber 13, with said collecting chamber thus closed against direct communication with the scrubbing chamber; and the flow from an oil well is supplied to chamber 11 through a pipe 18 which opens into the scrubbing chamber so as to provide for rotary motion of the flow in the annular scrubbing chamber. As an instance of this arrangement the pipe 18 may open into the annular scrubbing chamber at a tangent thereto as shown in Fig. 3.

In operation the well product comprising gas and oil and foreign matter such as sand and water is supplied through pipe 18 to the annular scrubbing chamber 11 where the major portion of the flow is held by flange 16 against immediate gravitational flow into settling chamber 12, and a rotary motion is set up by the tangential intake 18. The entire flow thus moves uninterruptedly around the scrubbing chamber so that the resulting centrifugal force tends to release the heavier sand and water from its intimate association with the oil and gas, and also tends to disassociate the oil and gas from their initial close intermingling. This centrifugal force finally directs the entire flow against the outer wall of the scrubbing chamber, with the various constituents, although somewhat released from their initial intimate association, still mixed one with the other; and the force of gravity then gradually draws through outlet 17 that portion of the rotating flow which has been centrifugally forced against the outer wall of the scrubbing chamber. After passage of the rotating flow through outlet 17, gravitational force gradually overcomes the circumferential force which has been imparted to the flow, and circumferential movement of the flow is thus first converted to a downwardly spiralling movement and finally merges into mere longitudinal movement as the flow gravitates further away from its tangential intake. The rotary agitation thus subsides by the time the flow reaches the body of fluid in the settling chamber 12, so that any gas which immediately separates from said body of fluid will be in a quiescent condition as it rises into collecting chamber 13, and the body of fluid in the settling chamber will also be in a quiescent state during separation of its various constituents.

The float 9 is so positioned as to maintain a liquid level in the settling chamber appreciably spaced below the scrubbing chamber, in order to insure rotary agitation of the flow subsiding to a quiescent condition by the time it reaches the body of liquid in the settling chamber; and as the flow collects in settling chamber 12, its various constituents although still intermingled, are somewhat disassociated or partially released from their initial close association as a result of the rotary agitation to which they have been subjected, and frothing having subsided as a result of the quiescent condition of the flow, the various constituents will readily stratify, with practically all of the gas, substantially free of oil and therefore in a dry condition, rising into the gas collecting chamber 13 for withdrawal through outlet 3, and the sand and water settling to the bottom of chamber 12 for separate withdrawal through pipe 2, and the separated oil collecting at the level of outlet 4 for separate withdrawal.

It will thus be seen that the gas which collects in chamber 13 is separated from the remainder of the flow only after the flow has subsided to a quiescent state, the scrubbing chamber being closed against direct communication with the gas collecting chamber and having only the outlet 17 beyond which the flow promptly subsides to a quiescent state and then collects in settling chamber 12 so that the entire separation and collection of gas is under conditions of non-agitation, thereby insuring the collection of dry gas.

I have thus provided for initial disintegration of the constituents of the flow from a well by means of centrifugal force, the flow moving in a continuous and uninterrupted circumferential path without abrupt change in its direction of movement such as would result in excessive frothing, with the flow then discharged into a distinctly separate settling chamber so as to promptly subside to a quiescent condition with the various constituents somewhat intermingled but partially disassociated as a result of the initial rotary agitation so that the lighter gaseous constituents will readily rise from the quiescent body of fluid and the heavier sand and water will similarly settle, thus providing for separate withdrawal of the gas and oil together with separate removal of the foreign matter such as sand and water, and the gas collecting chamber being closed against the rotatably agitated initial flow from the well and collecting only the gas which separates from the quiescent body of fluid formed subsequent to said initial agitation. It will be understood that throughout the specification the word "quiescent" as applied to the condition of the flow in the settling chamber and the condition of the gas as it rises into its collecting chamber, is used in a relative sense, i. e. the gas will continually rise through the body of liquid in the settling chamber and will flow upwardly into the collecting chamber, but aside from such uniform flow of gas the body of fluid is free from violent agitation or surging, and it is this condition of comparative inactivity which is defined by the word "quiescent".

I claim:

1. An oil and gas separator comprising a vertical cylindrical casing, the lower portion of the casing forming a settling chamber, a scrubbing chamber in the upper portion of the casing, said scrubbing chamber being formed by an annular wall spaced radially inwardly from the peripheral wall of the casing and having a radially projecting flange at its lower end terminating just short of the peripheral wall of the casing so as to close the base of the scrubbing chamber except for a restricted annular outlet communicating with the settling chamber, a collecting chamber in the upper portion of the casing communicating with the settling chamber through the bore of the annular wall, an intake for the flow from an oil well opening into the scrubbing chamber through the peripheral wall of the casing and adapted to direct the flow circumferentially around the scrubbing chamber, the inner and outer peripheral walls of the scrubbing chamber having non-obstructed interior surfaces providing for uninterrupted complete circumferential flow around the scrubbing chamber, an outlet from the settling chamber, an outlet from the collecting chamber, valves for said outlets, and a float control for said valves movable in accordance with the level of the flow with relation to the separator.

2. An oil and gas separator comprising a vertical cylindrical casing, the lower portion of the casing forming a settling chamber, an annular scrubbing chamber in the upper portion of the casing, said scrubbing chamber being closed at its base except for a restricted annular outlet at its outer periphery communicating with the settling chamber, a collecting chamber in the upper portion of the casing communicating with the settling chamber, means for directing the entire flow from an oil well into and circumferentially completely around the scrubbing chamber, an outlet from the settling chamber, and a valvular control for said outlet.

3. An oil and gas separator comprising a vertical cylindrical casing, the lower portion of the casing forming a settling chamber, an annular scrubbing chamber in the upper portion of the casing, said scrubbing chamber being closed at its base except for a restricted annular outlet at its outer periphery communicating with the settling chamber, a collecting chamber in the upper portion of the casing communicating with the settling chamber, means for directing the entire flow from an oil well into and circumferentially around the scrubbing chamber, the inner and outer peripheral walls of the scrubbing chamber having non-obstructed interior surfaces providing for uninterrupted complete circumferential flow around the scrubbing chamber, an outlet from the settling chamber, and a valvular control for said outlet.

4. An oil and gas separator comprising a settling chamber, an annular chamber above the settling chamber and closed at its base except for an outlet at its outer periphery communicating with the settling chamber, a collecting chamber communicating with the settling chamber, means for directing the flow from an oil well into and circumferentially completely around the annular chamber, an outlet from the settling chamber, and a valvular control for said outlet.

5. An oil and gas separator comprising a settling chamber, an annular scrubbing chamber above the settling chamber and closed at its base except for an outlet at its outer periphery communicating with the settling chamber, a collecting chamber communicating with the settling chamber, means for directing the flow from an oil well into and circumferentially around the scrubbing chamber, the inner and outer peripheral walls of the scrubbing chamber having non-obstructed interior surfaces providing for uninterrupted complete circumferential flow around the same, an outlet from the settling chamber, and a valvular control for said outlet.

6. An oil and gas separator comprising a settling chamber, an annular chamber above the settling chamber and closed at its base except for an outlet at its outer periphery communicating with the settling chamber, a collecting chamber communicating with the settling chamber, means for directing the flow from an oil well into and circumferentially completely around the annular chamber, an outlet from the settling chamber, and a float controlled valve for said outlet adapted to maintain a liquid level in the settling chamber appreciably spaced below the annular chamber.

7. An oil and gas separator comprising a settling chamber, an annular chamber above the settling chamber having a horizontal base closing the bottom of the annular chamber except for an outlet at its outer periphery communicating with the settling chamber, a collecting chamber communicating with the settling chamber, means for directing the flow from an oil well into and circumferentially completely around the annular chamber, an outlet from the settling chamber, and a float controlled valve for said outlet adapted to maintain a liquid level in the settling chamber appreciably spaced below the base of the annular chamber.

DAVID G. LORRAINE.